Dec. 24, 1968  J. M. TINSLEY ET AL  3,417,821
FLUID LOSS CONTROL
Filed June 8, 1966
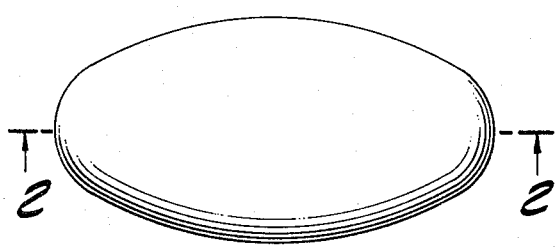
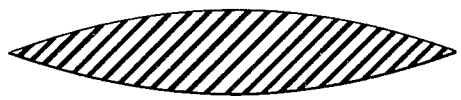
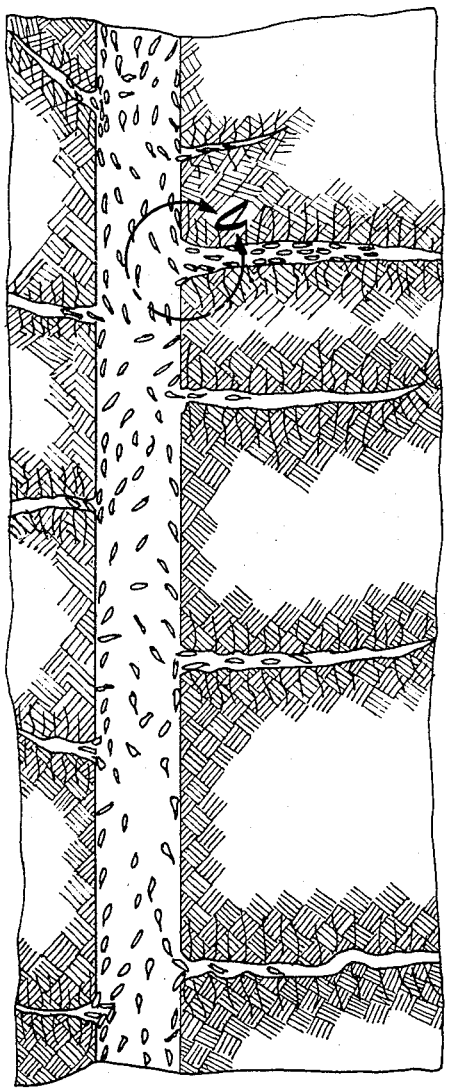
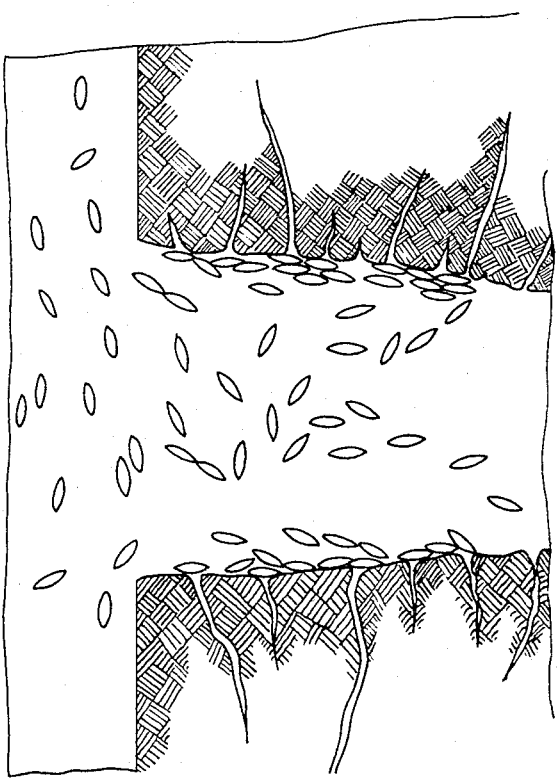
JOHN M. TINSLEY
WILLIAM T. MALONE
INVENTORS.
BY 
ATTORNEYS

3,417,821
FLUID LOSS CONTROL
John M. Tinsley and William T. Malone, Duncan, Okla., assignors to Halliburton Company, Duncan, Okla., a corporation of Delaware
Filed June 8, 1966, Ser. No. 556,081
6 Claims. (Cl. 166—42)

This invention pertains to the treatment of oil and gas wells. More particularly this invention pertains to a method of fracturing producing formations in oil and gas wells.

Heretofore, various techniques have been developed for increasing the productivity of oil and gas wells. For example, explosives are sometimes detonated in a well to either enlarge the well diameter or fracture the adjacent formations. However, the use of explosives is somewhat restricted in cases where pipe is present in the bore hole. Various other techniques have been proposed, for example, horizontal drilling is sometimes employed to increase the surface area of a well in the vicinity of a producing zone. This technique is expensive and the increased productivity obtained is rarely commensurate with the increased cost. Acidizing is also utilized to increase the permeability of formations adjacent to a well. However, this procedure is limited to calcareous formations. Yet another fracturing techniques involves the use of various low penetrating fluids whereby it is possible to fracture permeable formations in a well by the application of hydraulic pressure. However, this technique requires the use of certain types of fluids which have little or no tendency to leak into the formation and to thus permit the application of adequate hydraulic pressures in the well.

Granular particles must be of a varying size to effectively seal the wide range of pore sizes existing in a porous formation. Therefore the smaller particles will penetrate the larger pores and the larger particles will ineffectively seal the smaller ones. These conditions could result in inefficiency and/or formation plugging. According to the present invention, platelets are used which are larger than the larger pores but which plate out over all existing pore sizes.

Accordingly, it is an object of the present invention to provide a novel method of fracturing formations in wells.

Another object of this invention is to provide a method of fracturing permeable formations in a well by the application of hydraulic pressure.

More specific object of this invention is to provide an an improved composition and method of employing this improved composition for fracturing producing formations thereby increasing the permeability of the formations adjacent to a well and consequently the productivity of a well.

Still another object of the present invention is to place thin disks having some degree of elasticity in the entrance to pores in the formation to reduce fluid loss and improve fracturing.

These and other objects of the present invention will become apparent from the detailed description which follows.

Briefly, the present invention comprises the use of a fracturing fluid containing an effective fluid loss controlling amount of an elastic (including partially elastic) disk-shaped particle which acts as a sealing agent. This invention further includes the use of such a fracturing fluid in a method of fracturing the formation adjacent the producing zone of an oil or gas well.

More particularly, the invention comprises the use of an elastic or partially elastic disk or platelet fluid loss additive or sealing agent having a greater thickness at its center than at the edges. The sealing agent while having some degree of elasticity also has sufficient shear strength to prevent rupture by the pressure during fracturing.

Several advantages have been found to reside in the use of the disk-like sealing agent of the present invention including lower concentrations of fluid loss additive required for control of fluid loss properties, satisfactory fluid loss control over a wide range of pore sizes and permeabilities, and little or no penetration of the sealing agent into the pores thus preventing or reducing formation damage.

The invention may be further understood by reference to the accompanying drawing in which:

FIGURE 1 is a perspective view of a typical sealing agent employed in this invention;

FIGURE 2 is a sectional view of a sealing agent utilized in the present invention taken along the line 2—2 in FIGURE 1;

FIGURE 3 is a sectional view of the fracture in a well showing the sealing action accomplished by the shaped fluid loss additive utilized in the present invention; and FIGURE 4 is an enlarged view of a portion of FIGURE 3.

The novel fracturing fluid of this invention is used in well fracturing to increase productivity of the well. In general, the injection and pressurizing procedures utilized are similar to those already familiar to those skilled in the art. For example, one method of fracturing employing the fluids of the present invention comprises introducing the fluid containing the disk-like fluid loss control agent into a confined zone of a well at a rate sufficient to increase the pressure exerted in the zone until formation fracture occurs, as evidenced by a decrease in resistance to flow of the fluid. Once the desired fracture has been accomplished, injection may be continued to displace the fluid into passages or fractures formed in the formation.

The shaped fluid loss control particle will tend to seal the pores and permeable avenues adjacent to the fracture and allow deeper penetration of the fracturing fluid by retaining fluid within the fracture thus increasing fracture extension. Similarly thickened and gelled fluids containing sand or other granular materials may be injected to prop the formation.

The fracturing fluid of the present invention may be readily removed from the formation since the disk-like fluid loss agents themselves have little or no tendency to travel deep into the matrix adjacent to the fracture. The ease of removal is of importance in avoiding the formation of undesirable materials in the formation which would otherwise tend to reduce the flow of formation fluid from the producing zone into the bore hole. In general, the sealing agents of the present invention may be readily removed from the face of the pores and the bore hole by pumping, producing of the well, or the use of solvents which dissolve the sealing agents.

It is to be understood that not all of the sealing agents when introduced into the cracks surrounding the producing formation will enter in the manner depicted in the drawings, i.e., edge first. But it is apparent that a fair proportion of the many particles present in the fracturing fluid will do so.

The sealing agents utilized in the present invention may be organic or inorganic in nature, and may or may not be soluble in formation fluids. Since these materials do not require substantial penetration into the formation pores to accomplish a seal, a material which is soluble in either the fracturing or formation fluid is not necessary although such expedient may be advantageous in certain cases.

The novel sealing agents of the present invention are generally from about 0.1 to 10 millimeters in diameter and have a maximum thickness at the center of from about 0.05 to about 3 millimeters. The sealing agents are utilized in an effective amount of from about 0.1 to about 1.0 percent based on the weight of the fracturing fluid.

The term "disk-like" shape as used herein and in the appended claims is intended to include all fabricated particles or natural occurring particles having a flat platelet geometry which has a diameter larger than the thickness. The disk may be uniformly or non-uniformly tapered from the center to the edges. I have found that basically the shape which will function most effectively includes a center portion which is thicker than the edges such that the particles will tend to seal the openings in the formation and to be held therein by the action of the fracturing fluid. Most desirable shapes appear to include circular-like disks having a thickness sufficient to prevent undue distortion or fracturing of the particle when subjected to the fracturing pressure in use.

The fluids used in the fracturing fluids of this invention may include any of those already familiar to those skilled in the art. The choice of fluid for use with any particular size, shape and composition of sealing agent may be easily determined to provide the desired degree of dispersion, viscosity and the like for any specific application.

Any suitable material that can be fabricated to produce the desired shape can be used. Most desirable are materials which are capable of being suspended in conventional fracturing fluids, and thus will not have any adverse effect upon the fluid properties. The fracturing fluids of the present invention can contain a blend of different sized sealing agents. In any event, however, it will be understood that the fracturing fluids embodying the present invention will contain a plurality of disk-like particles and commonly at least substantial quantities thereof will be identical in diameter and thickness.

From the foregoing description it will be understood that a novel fracturing fluid composition and process for the use of the same has been provided. The sealing agent utilized in this invention is relatively inexpensive and permits the use of fracturing techniques in formations heretofore impossible to effectively and conveniently fracture. By present invention there is accomplished effective fracturing of the formation without any subsequent adverse effect on the productivity of the gas or oil zone surrounding the bore hole.

Having fully described the invention, it is intended that it be limited only by the lawful scope of the appended claims.

We claim:
1. The method of fracturing in a well traversing a producing zone which comprises injecting into the formation in the vicinity of the producing zone a fracturing fluid comprising a fracturing fluid containing an effective sealing amount of a fluid loss control additive comprising a disk-like elastic member which is thicker at the center than at the periphery.

2. The method of claim 1 wherein the sealing agent is a thin disk which tapers uniformly from its center to the periphery.

3. A novel fracturing fluid containing an effective sealing amount of a fluid loss control additive comprising a fracturing fluid containing an effective sealing amount of a fluid loss control additive comprising a disk-like elastic member, said member being thicker at the center than at the periphery.

4. The fracturing fluid of claim 3 wherein the fracturing fluid contains from 0.1 to 1.0 weight percent of the sealing agent.

5. The fracturing fluid of claim 3 wherein the sealing agent is a thin disk which tapers uniformly from its center to the periphery.

6. The fracturing fluid of claim 3 wherein a substantial portion of said sealing agents are of identical size and shape.

References Cited
UNITED STATES PATENTS

| | | | |
|---|---|---|---|
| 1,807,082 | 5/1931 | Boynton | 175—72 |
| 2,699,212 | 1/1955 | Dismukes | 166—42 X |
| 3,217,801 | 11/1965 | Fast et al. | 166—42 |
| 3,316,967 | 5/1967 | Huitt et al. | 166—42 |

DAVID H. BROWN, *Primary Examiner.*

U.S. Cl. X.R.

175—72